United States Patent [19]
Ansorge et al.

[11] Patent Number: 6,089,512
[45] Date of Patent: Jul. 18, 2000

[54] TRACK-GUIDED TRANSPORT SYSTEM WITH POWER AND DATA TRANSMISSION

[75] Inventors: Ulrich Ansorge, Boeblingen; Horst Wunderlich, Entingen; Michael Aldinger, Neu-Ulm; Anton Seelig, Floersheim; Bernhard Huder, Kempten, all of Germany

[73] Assignees: Daimler-Benz Aktiengesellschaft, Stuttgart; Cegelec AEG Anlagen und Automatisierungstechnik GmbH, Frankfurt, both of Germany

[21] Appl. No.: 08/913,857

[22] PCT Filed: Mar. 30, 1996

[86] PCT No.: PCT/EP96/01407

§ 371 Date: Sep. 23, 1997

§ 102(e) Date: Sep. 23, 1997

[87] PCT Pub. No.: WO96/31381

PCT Pub. Date: Oct. 10, 1996

[30] Foreign Application Priority Data

Apr. 3, 1995 [DE] Germany ............................ 195 12 107
Apr. 3, 1995 [DE] Germany ............................ 195 12 523

[51] Int. Cl.⁷ ........................................................ B61L 1/00
[52] U.S. Cl. ............................ 246/194; 246/63 R; 246/8; 191/10; 104/88.03
[58] Field of Search ........................... 246/63 C, 8, 63 R, 246/194; 191/10; 104/88.03, 88.02, 297, 296; 333/237; 343/771; 455/523

[56] References Cited

U.S. PATENT DOCUMENTS

| | | | |
|---|---|---|---|
| 3,781,687 | 12/1973 | Nakahara et al. | 246/8 |
| 4,789,049 | 12/1988 | Watanabe et al. | 191/10 |
| 4,932,617 | 6/1990 | Heddebaut et al. | 246/8 |
| 4,969,400 | 11/1990 | Burg et al. | |
| 4,974,520 | 12/1990 | Dehne. | |
| 5,709,291 | 1/1998 | Nishino et al. | 191/10 |
| 5,831,841 | 11/1998 | Nishino et al. | 191/10 |

FOREIGN PATENT DOCUMENTS

| | | |
|---|---|---|
| 2209792 | 9/1973 | Germany. |
| 2310385 | 9/1974 | Germany. |
| 2404363 | 10/1974 | Germany. |
| 2840215 | 4/1979 | Germany. |
| 3641594 | 6/1979 | Germany. |
| 3238754 | 7/1983 | Germany. |
| 3702248 | 8/1987 | Germany. |
| 3806347 | 9/1989 | Germany. |
| 3900511 | 7/1990 | Germany. |
| 3926401 | 2/1991 | Germany. |
| 3942009 | 7/1991 | Germany. |
| 69201284 | 3/1993 | Germany. |
| 4305233 | 8/1994 | Germany. |
| 5-344603 | 12/1993 | Japan ......................................... 191/10 |
| 2277069 | 10/1994 | United Kingdom. |
| 92/17929 | 10/1992 | WIPO. |

OTHER PUBLICATIONS

Dr. Wolfgang Bode: "Einsatz drahtloser Uebertragungstechniken in Logistik– und Lagersystemen". In: Flurforerderzeuge, dhf Dec. 1986, pp. 19–26.

"Die Technik im Leben von heute". 24 WFD–Technik, pp. 368, 369. (No date).

G.G. Pivnjak et al.: "Transportmittel mit induktiver Energieuebertragung". In: Elektrie, vol. 34, No. 7, Berlin, pp. 339–341. (No date).

*Primary Examiner*—Mark T. Le
*Attorney, Agent, or Firm*—Venable; George H. Spencer; Allen Wood

[57] ABSTRACT

A track-guided transport system with power and data transmission and used for conveying goods. The transport system is provided with a transport element having drive and track-guide elements; storage, input and output units for goods; and a data processing and transmission unit. The transport element is provided with a transmission head as a secondary element for transferring power from a primary circuit laid along the track, the transmission head is mounted on the vehicle comprising a ferrite core and a secondary winding surrounding the core and magnetically is coupled to the primary circuit. An adjustable and controllable drive unit may be provided for forward motion; and a device may be provided for the forward motion for low-friction compensation of gravity and to ensure low-friction sliding along a track, as well as track-guide elements.

20 Claims, 10 Drawing Sheets

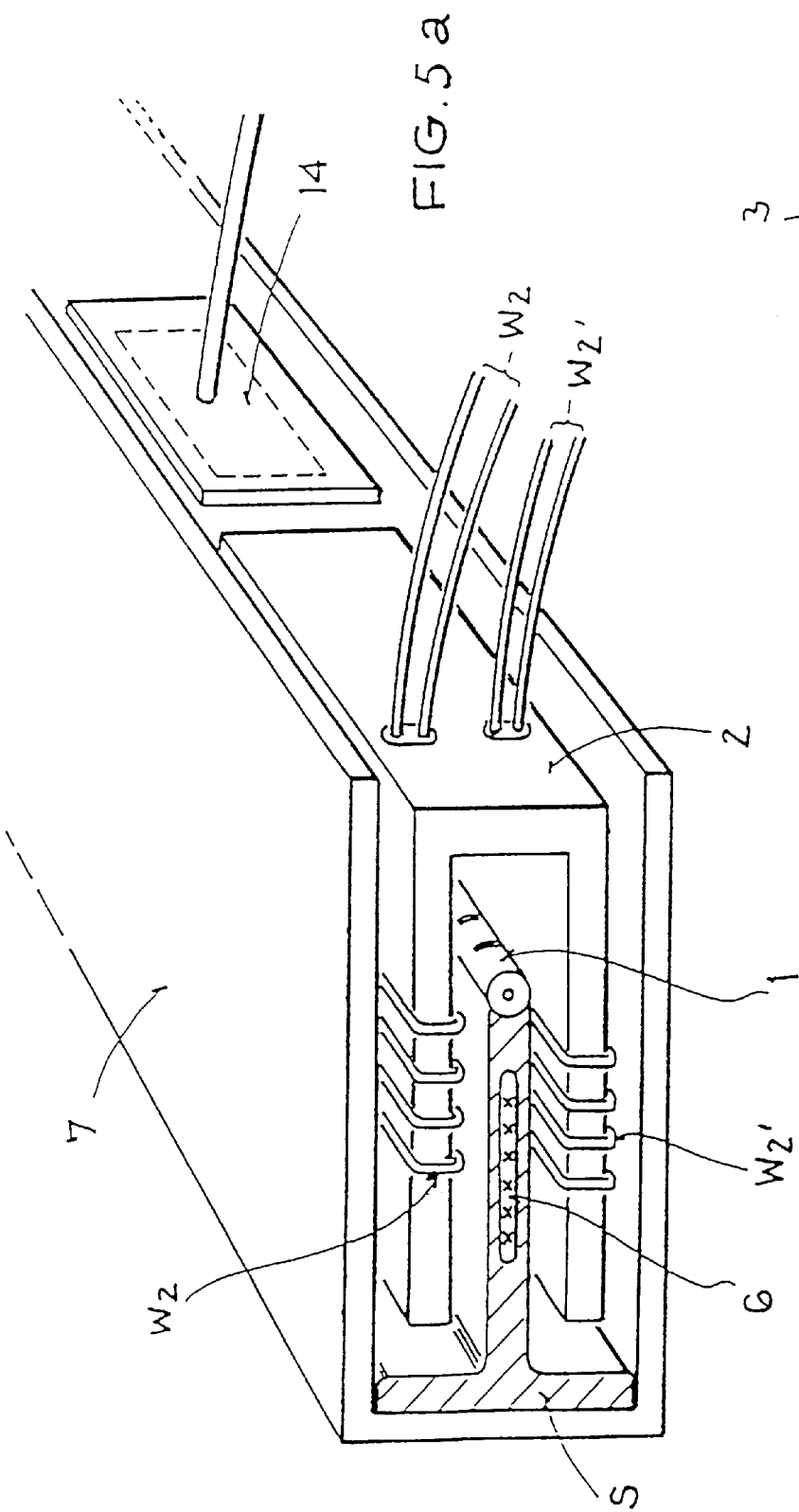
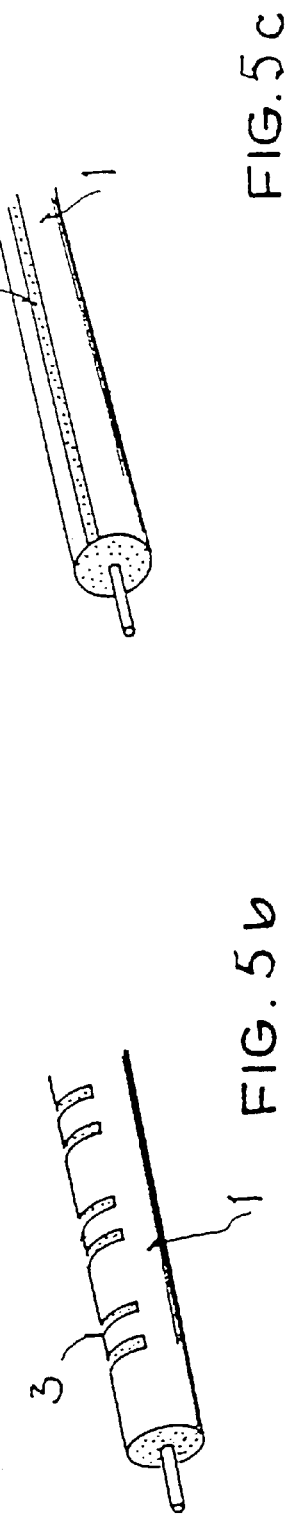
FIG. 5a
FIG. 5b
FIG. 5c

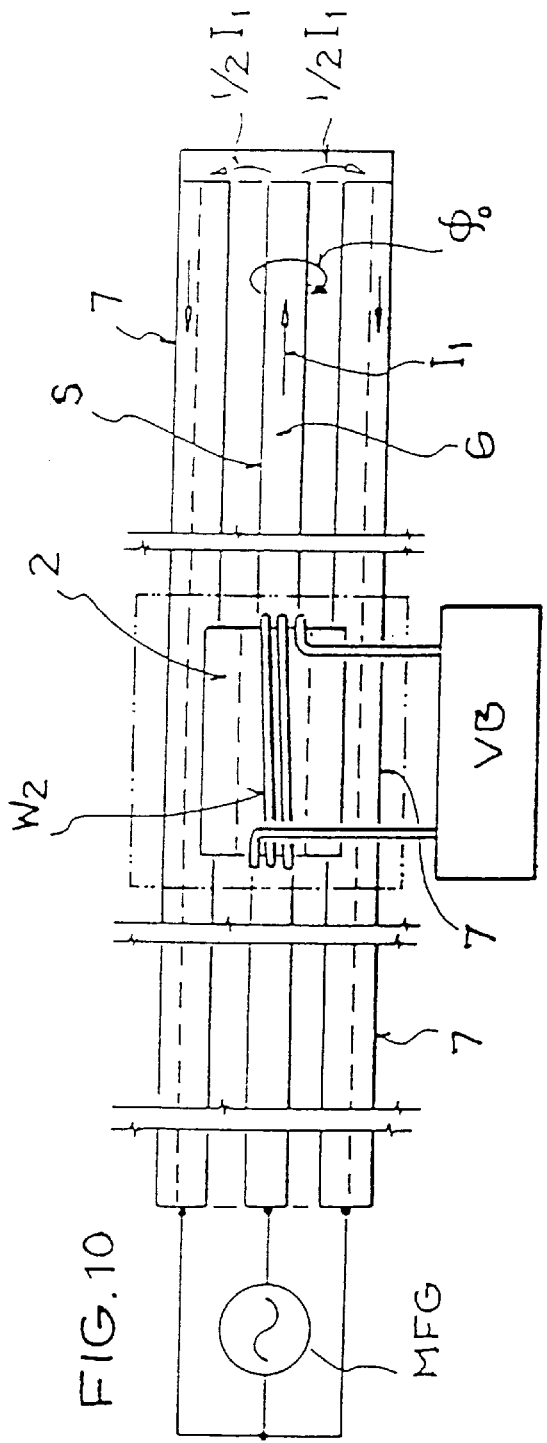
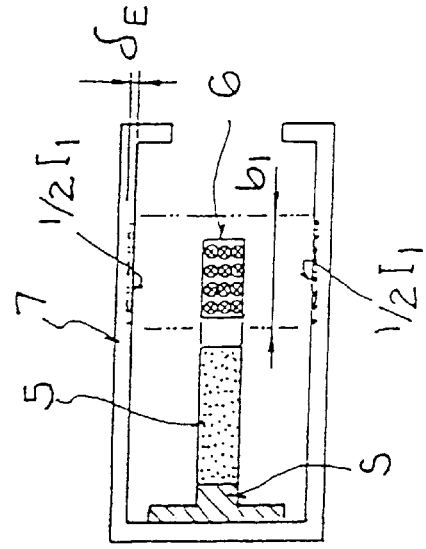
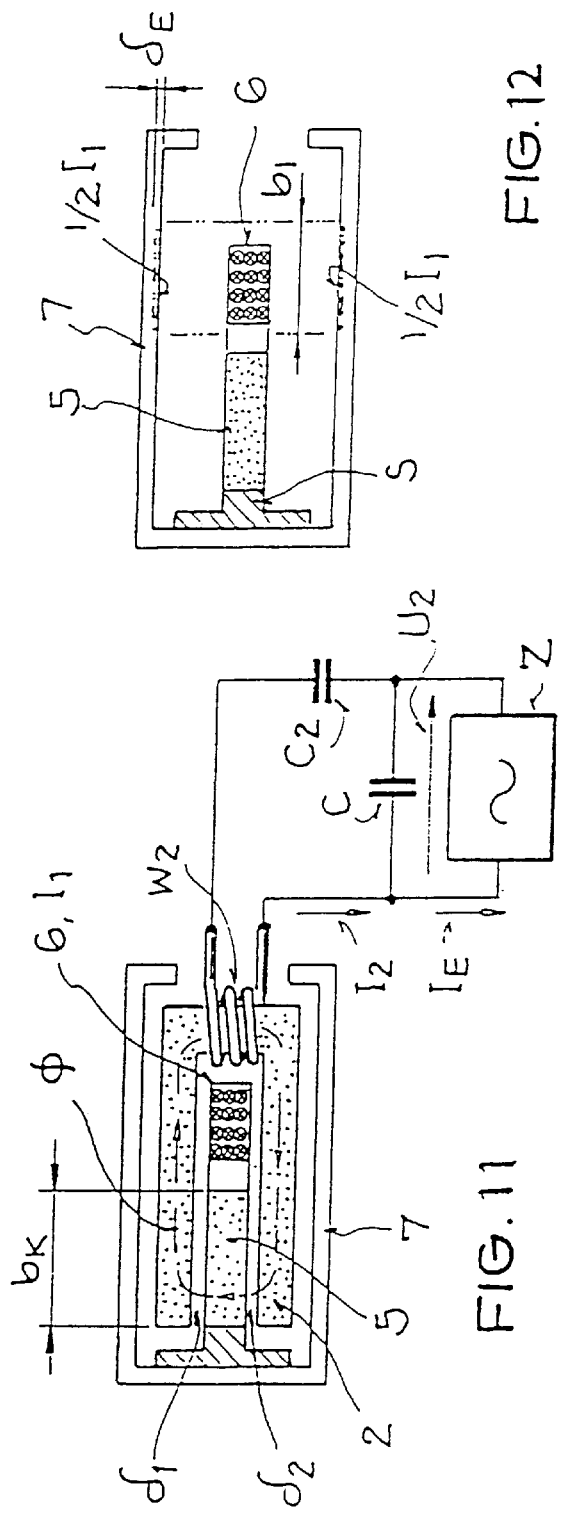
FIG. 10
FIG. 11
FIG. 12

TRACK-GUIDED TRANSPORT SYSTEM WITH POWER AND DATA TRANSMISSION

BACKGROUND OF THE INVENTION

The invention relates to a track-guided transport device having energy and information transmission for conveying goods, there being a transport element that includes elements for driving and track guidance.

Transport devices are used in numerous embodiments in production and storage. For example, the automobile industry has a supply system for assembly parts required on the assembly line; this system includes a track-guided telpher line which, with its own drive, can reach the individual workstations.

Containers with goods or pallets that must be loaded onto vehicles are found in high-shelf storage facilities. To this end, a lifting conveyor, for example, is provided that surmounts the difference in height between the vehicles and the spaces in the high-shelf facility. The vehicle docks, for example, at the lifting conveyor that has been allocated to it, and transfers the pallet to be stored to the conveyor. Based on the identification that the pallet bears, or that has been transmitted to the lifting conveyor by the vehicle, the conveyor can begin to sort the pallets.

The loading surface of this type of vehicle can also be configured differently, depending on the purpose of the application. For example, a transverse goods conveyor is very useful in loading and unloading containers or pallets. Of course, for assembling commissions, a container can travel with the vehicle to different stations and be loaded with parts from the stock.

It is apparent that future transport devices for executing the described, multi-faceted assignments will have to be based on technologically highly-developed partial systems constructed from system components that can be standardized for realizing economical individual solutions for the broad application spectrum. Low wear, low noise development and a small energy consumption are of high priority in the development of these systems. The basic partial systems of transport devices of this type include:

support and track-guidance elements for application-specific construction of paths of travel, or networks thereof, for transport vehicles.

Autonomous, computer-guided transport vehicles having their own electrical drive and application-specific actuators and sensors and an information transmission on the vehicles. Such transport vehicles are also referred to hereinafter as transport elements.

Energy-transmission devices comprising primary-side energy-transmission elements for constructing electrical energy-supply circuits, hereinafter referred to as primary circuits, that extend along the paths of travel, and secondary-side energy-transmission elements disposed on the vehicles for receiving electrical energy from the primary circuit during movement and non-movement of the vehicles.

Information-transmission devices for the bidirectional exchange of movement, control and signalling information between stationary stations and vehicles, as well as between vehicles.

The application PCT/GB92/00220, on which the invention is based, discloses a contactless, inductive energy transmission to transport vehicles. In this application, a double line that forms the primary circuit is laid along the path of travel and fed with a 10-kHz current. The two conductors of the primary circuit are supported by supports comprising electrically and magnetically non-conductive material. For receiving energy, at least one E-shaped transmitter head having a ferrite core is disposed on each transport vehicle, with the middle leg of the core supporting a secondary winding and projecting deep into the space between the two conductors. The primary circuit of the double line and the secondary winding of the transmitter head are electromagnetically coupled by way of the ferrite core, so the energy required for the drive, for example, on the vehicle, that is, transport element, is transmitted from the primary circuit to the secondary winding, and from the winding, the energy is supplied via electronic control and regulation devices to the drive and further consumers on the transport element. A double line of this type possesses an electromagnetic scatter field that propagates far into the surrounding area and causes electromagnetic disturbances in neighboring signal lines, and induces eddy currents in neighboring metal parts, for example the support and track-guidance elements, particularly if they comprise steel; these eddy currents are associated with considerable energy losses. To reduce these disadvantages, therefore, it is necessary to provide a shield for the double line, which requires additional space and increases costs. The expanded scatter field of the double line also effects a high power inductance, and, because of the high frequency, it also effects a large inductive line drop that must be compensated by a correspondingly high outlay for capacitors.

GB-A-2 277 069 proposes laying a leakage waveguide along the path of travel for the bidirectional exchange of information between a stationary station and a track-guided transport element having a remote-controlled camera; the waveguide comprises a coaxial cable having an incomplete, wide-mesh, external shield. To minimize disturbances caused by interference, it is provided to localize the information transmission in the vicinity of the path of travel. In this transport device, the energy transmission is effected via a power bus comprising conventional sliding-contact rails. From FIG. 4 and page 11, lines 9–18 of the description, it ensues that signals are also transmitted via these known contact rails. Signal transmission via leakage waveguides is not described in detail.

DE-A-3 926 401 discloses a transport device for pallets and containers that are supported by magnetic fields and guided in a track. The application deals solely with a high-speed transport system that is to be installed in single-lane tunnels and is intended to assume transport tasks that were heretofore reserved for railway, long-distance automobile transport and land-plane transport. Here the moved transport elements are totally passive, so the principle applied here is relatively inflexible for the multi-faceted transport tasks of production and storage technology.

These transport devices of the state of the technology respectively realize only one of the aforementioned partial systems that are advantageous for future, flexible transport tasks in storage and production technology, such as contactless energy transmission and contactless information transmission to an autonomic transport element having its own, computer-guided drive, which is also advantageously configured as a linear drive and is combined with a magnetic support and track-guidance system. The combination of these partial systems in a transport device offers the opportunity of mechanically integrating different partial systems with respect to function, and results in structurally advantageously embodied, space-saving, low-cost, standardized system components with low wear, low operating noise and a small energy consumption.

SUMMARY OF THE INVENTION

It is therefore the object of the invention to refine a track-guided transport device according to the preamble to claim 1 such that an uninterrupted supply of energy and information to a transport element during movement is effected without wear or noise, and the necessary means, particularly the conductor arrangements, are compact and structurally simple, and are disposed in the region of the track-guidance and support elements, and are mechanically protected by them.

One area of application of the invention is in the replacement of devices in which energy is supplied by way of sliding contacts or trailing cables. Significant applications for contactless transmission of electrical energy include traveling trolleys of hoists, high-shelf storage facilities or magnetic tracks. This type of system for transmitting energy and information would also be advantageous for elevators. Robots that travel specific paths and must rotate about an axis to perform at different stations can likewise be supplied with energy by such a system.

An essential advantage of the invention lies in the "coaxial" arrangement of the energy transmission. At the end of the path of travel, the center conductor is connected to the U-shaped outside conductor, so the current flows back from the center conductor via the outside walls. The current is distributed onto two outside walls. Despite the small penetration depth, the current makes use of a large cross section. The coaxial arrangement ensures, on the one hand, the smallest possible line inductance, so larger transmission lengths are possible, and at the same time, the arrangement is shielded with respect to out-scattering fields. The scatter field $\Phi_0$ is essentially only inside the coaxial conductor, namely in and around the center conductor. The combination of the shield housing with the return line results in the additional advantage of a savings in conductor material. Also, the small inductances save a considerable number of capacitors for compensating the inductive line drops.

The transmission of information with the aid of a slotted coaxial cable also offers numerous advantages in combination with the contactless transmission of energy. There are no disturbances in the wave propagation due to third parties, and no reflection or shadowing that could interfere with radio signals, for example in a high-shelf storage facility. The data throughput can be from one to 4 Mbit/sec. Thus, autonomic traveling operation is possible with a vehicle that automatically handles all automation and control tasks. Even a communication between the individual vehicles is possible.

The advantages of the invention also include a greater flexibility of transport means, since all vehicles are monitored and automatically guided by a central information-processing and control center in the form of a stationary station, with the vehicles again traveling automatically to their short-range destinations.

The invention is described in detail below in conjunction with the drawings.

BRIEF DESCRIPTION OF THE DRAWINGS

FIG. 5 illustrates the mechanical integration of the leakage waveguide and the conductor arrangement of the energy transmission;

FIG. 10 illustrates the arrangement of the open coaxial conductor in longitudinal section and plan view, respectively;

FIG. 11 is a cross-section through the open coaxial conductors with the transmitter head;

FIG. 12 is a cross-section through the open coaxial conductor at a point at which no moved system is currently located.

DESCRIPTION OF THE PREFERRED EMBODIMENTS

Figure 1:
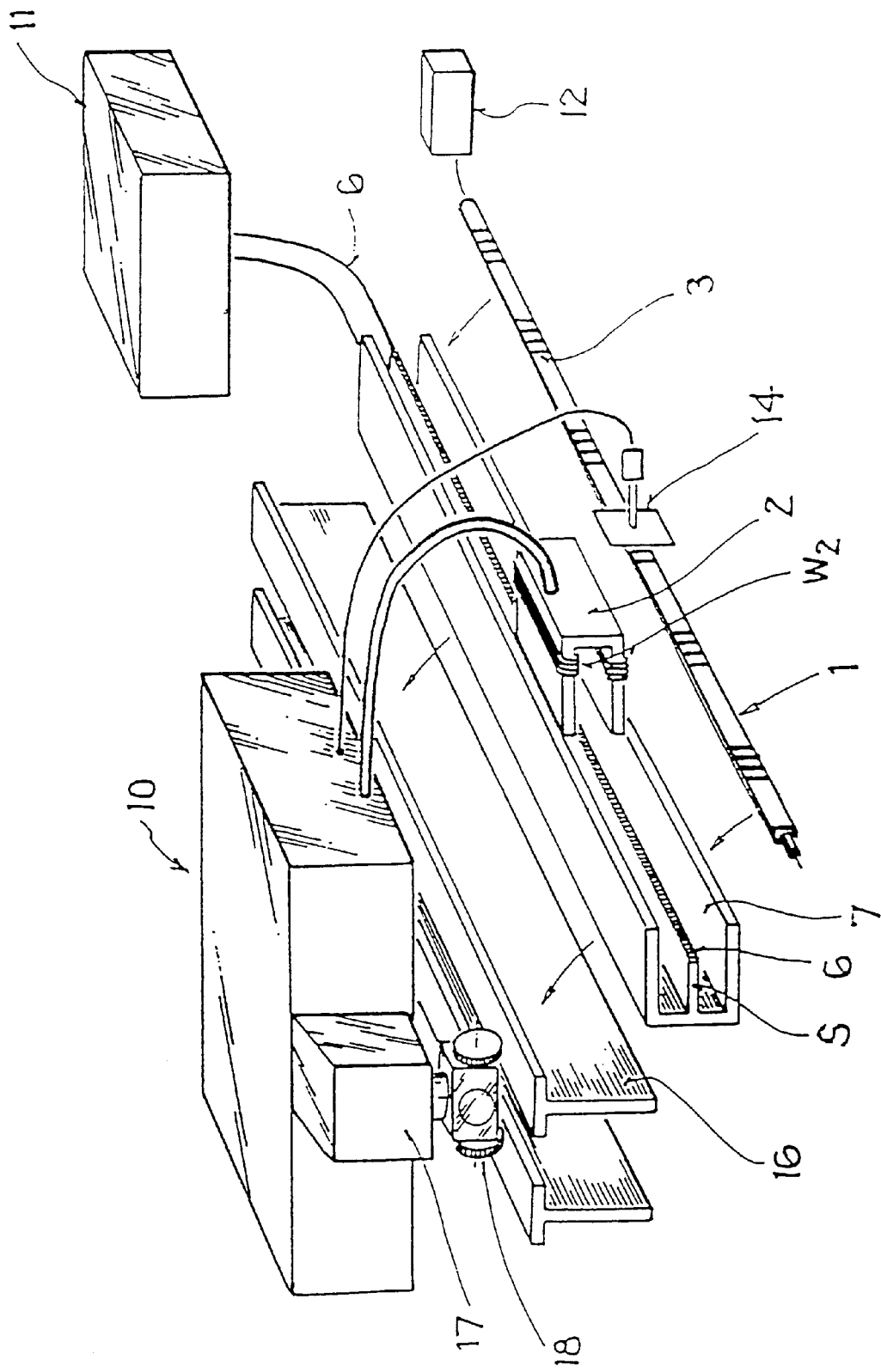
FIG. 1 is a schematic view of the transport device.

The invention is first described in conjunction with the schematic representation of FIG. 1.

The transport element 10 intended for transport runs on rollers 18, for example, which in turn run on rails 16, with the drive being effected with the aid of a motor 17. Lateral guidance and the type of device are irrelevant for the principle illustrated in FIG. 1, but a low-wear type of drive is desired. The contactless energy transmission supplies the energy for the motor drive and further servo drives. The transmission comprises a transmitter head 2 having the winding $W_2$ as a secondary part that is moved with the transport element 10, as well as the stationary primary circuit of the transmitter comprising the center conductor 6 and the outside conductor 7 and a support S. The center conductor 6 is set into a plastic conductor support or web S. The core of the transmitter head 2 preferably comprises a ferrite material. The primary element is an E-shaped arrangement that is open to one side. The arrangement is secured to the support rail 16. The primary circuit is fed by a medium-frequency generator 11. The information transmission is effected from a stationary station 12, which transmits information via a coaxial cable 1 along the rail path, the cable being provided with an opening 3. A "patch" antenna 14 conducts the information further to a mobile station mounted to the car, which runs on the rails characterized as support elements 16.

Figure 2:
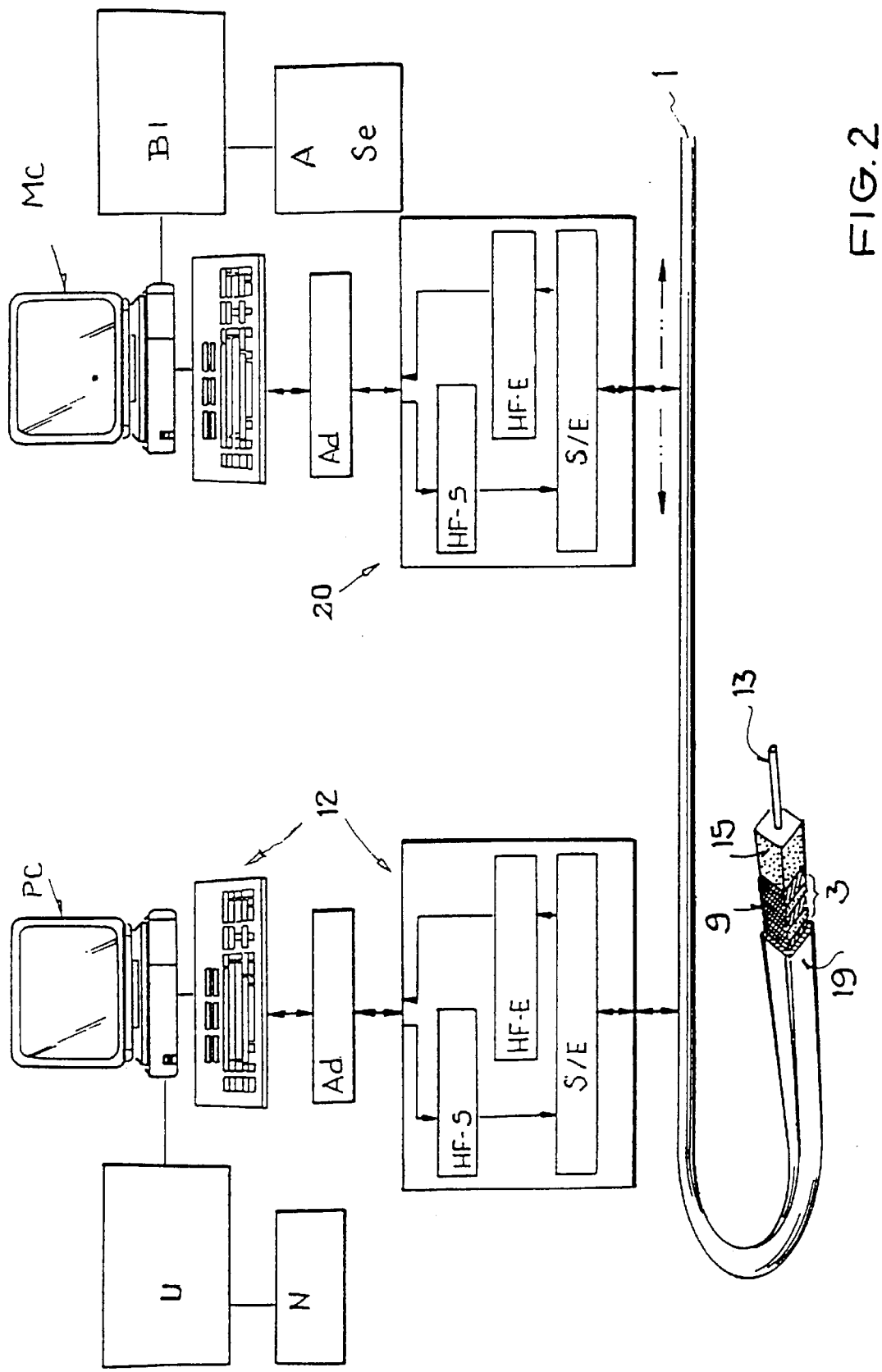
FIG. 2 is a block diagram of the contactless information transmission.

FIG. 2 shows the structure of the data transmission in more detail. From the stationary station 12, the waveguide 1 is fed by means of a travel program or a software U from a network or data memory N via an adapter module Ad and an HF transmitter/receiver part HF-S and HF-E by way of a switch S/E. The transmitter/receiver part and the data processing on the transport elements 10 are provided with the reference numeral 20 in FIG. 2. The design of this unit corresponds to the arrangement in the stationary station 12. The waveguide comprises, for example, a copper conductor 9 of a coaxial cable, the conductor being provided with slots 3, and the inside conductor 13, the insulator 15 and the jacket 19. The cross section can be circular or square. At the waveguide, the signals are transmitted via an HF modem and an adaptor module to a mini-PC MC that determines the execution of commands via a unit BI, and the drive control and activation of actuators included in the unit A, into which sensors Se also input signals. This configuration results in a high flexibility of the system of individual transport elements 10, because each car can travel independently of the others.

Figure 3:
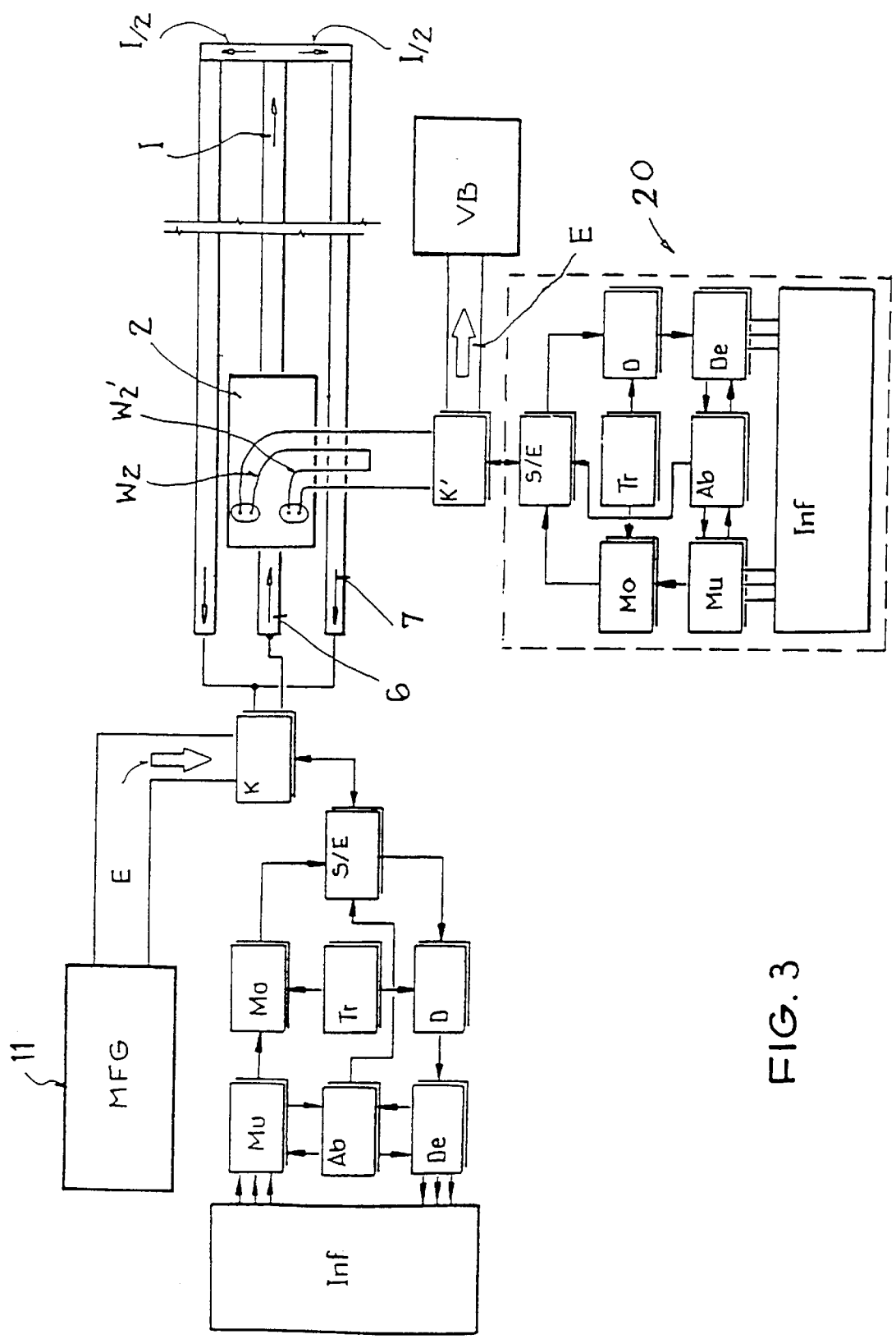
FIG. 3 illustration a combination of energy and information transmission.

FIG. 3 shows, by way of example, a combination of energy and information transmission in which the information transmission utilizes the conductors 6 and 7 of the energy transmission. For this purpose, a coupling element K configured as a filter, for example, is provided at the feed-in point for the energy transmitter. It superposes the medium-frequency current from the generator MFG with a higher frequency for transmitting information. Because the information transmission takes place both in the direction from the stationary station 12 to the transport element 10 and vice versa, a transmitter/receiver switch S/E is provided at the input of the coupling element K, the switch alternatingly switching modulators Mo and demodulators D on and off for transmitting information. On the moved system, the windings $W_2$ and $W_2'$ of the transmitter head are likewise connected to a coupling element K' configured as a filter and, again, effecting the separation of energy E and information. The energy is supplied to the consumers VB.

Figure 4:
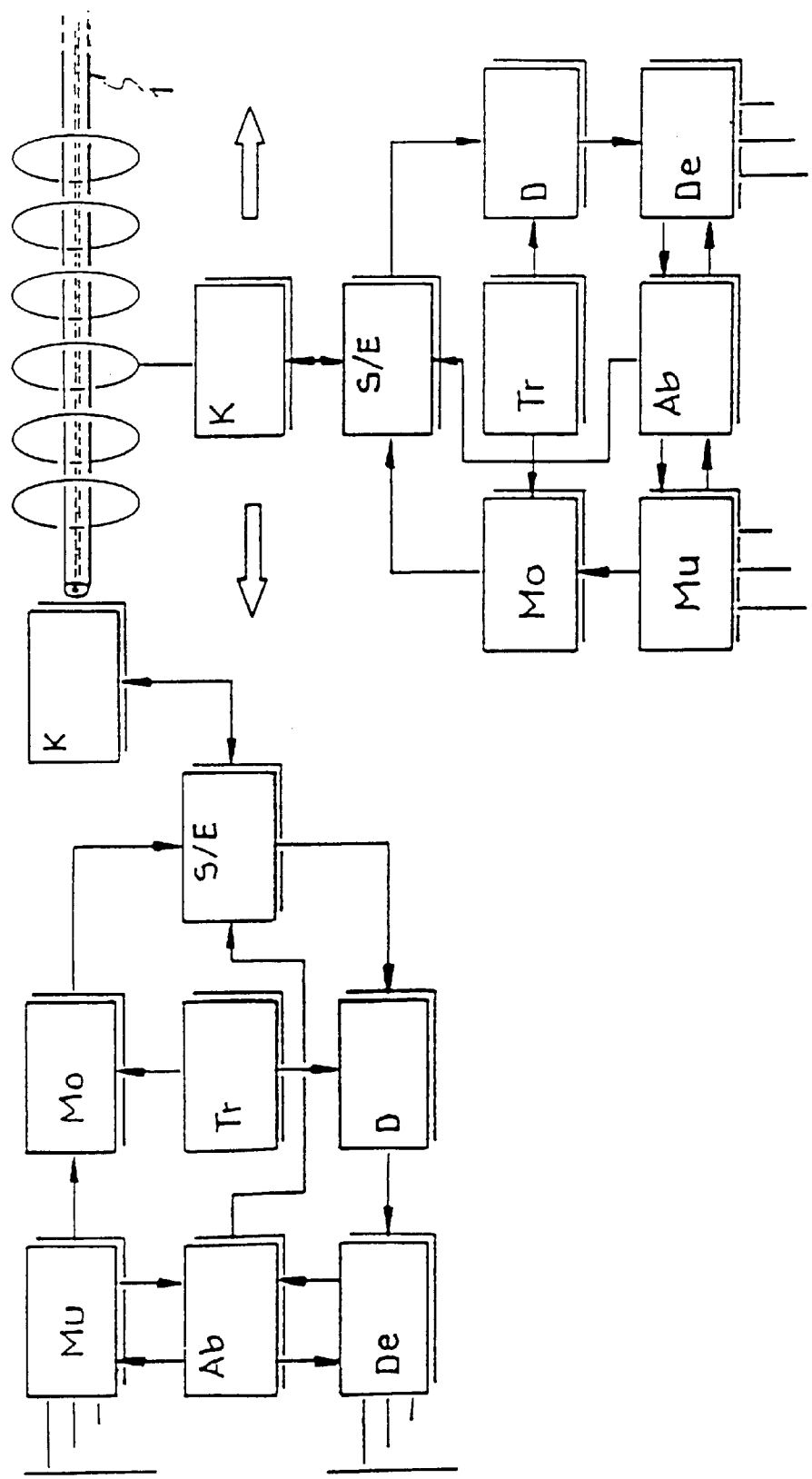
FIG. 4 is a block diagram illustrating the principle of information transmission via a waveguide.

FIG. 4 shows a corresponding information-transmission structure with a separate leakage waveguide 1. In this instance, the information transmission is completely independent of the energy transmission. The waveguide is advantageously operated in the ISM band, which is cleared for industrial, scientific and medical purposes, because it assures rapid data transmission at a carrier frequency of 2.4 GHz, and, due to the small range, the transmission of public information cannot be impeded. The waveguide is a leakage waveguide, in whose immediate vicinity an antenna or near-field sensor is guided on the moved system and transmits the information between the two coupling elements. As illustrated in the block diagram, the information is transmitted to and received from the waveguide 1 via the coupling elements K. In the process, a switch S/E ensures switching between transmitting and receiving operations (bidirectional operation). The signals are modulated or demodulated, respectively, on the primary and secondary sides of the information transmission, and a process control determines whether data are to be received or transmitted.

FIG. 5a shows an exemplary integration of the energy-transmission system and the information system. The leakage waveguide 1 is disposed at the upper end of the conductor support S, above the medium-frequency conductor 6. The leakage waveguide can be provided with periodically-disposed transverse slots 3 (FIG. 5b) or a throughgoing longitudinal slot according to FIG. 5c. The transverse slots disposed periodically in groups effect a radiation that effects the coupling to a dielectric patch antenna 14. This type of transmission requires minimum spacing between the leakage waveguide and the patch antenna for generating a high-frequency field of consistent intensity surrounding the patch antenna. The patch antenna is therefore preferably disposed laterally next to the transmitter head.

Figure 9:
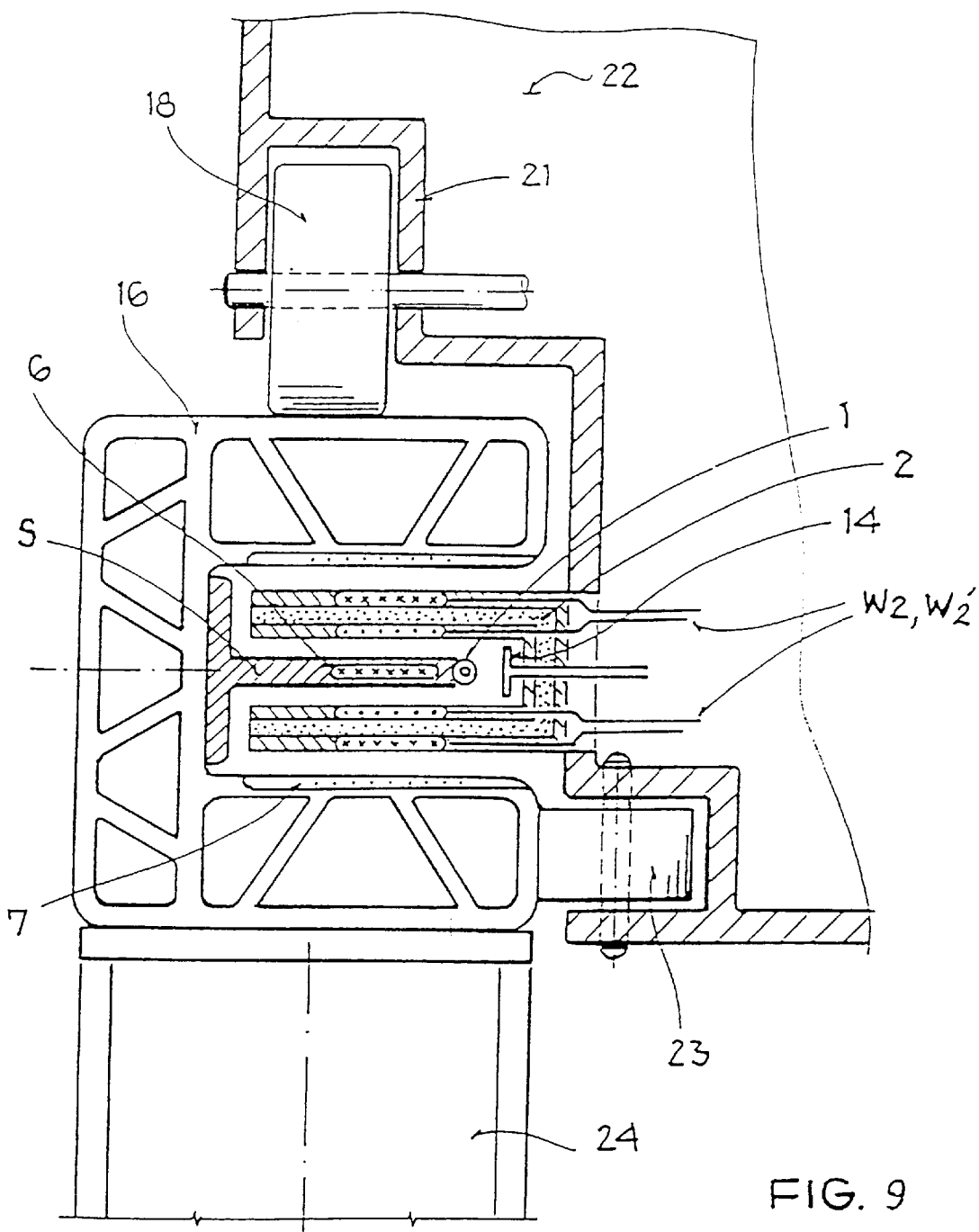
FIG. 9 illustrates a representation of the integration of the outside conductor of the energy transmission into the support and guide elements.

The throughgoing longitudinal slot in the leakage waveguide (FIG. 5c) leads to the formation of a near field in its immediate vicinity. Correspondingly, an advantageous arrangement of the near-field sensor 14 is shown in FIG. 9; namely, the sensor is disposed inside the transmitter head with maximum spacing from the leakage waveguide.

Figure 6:
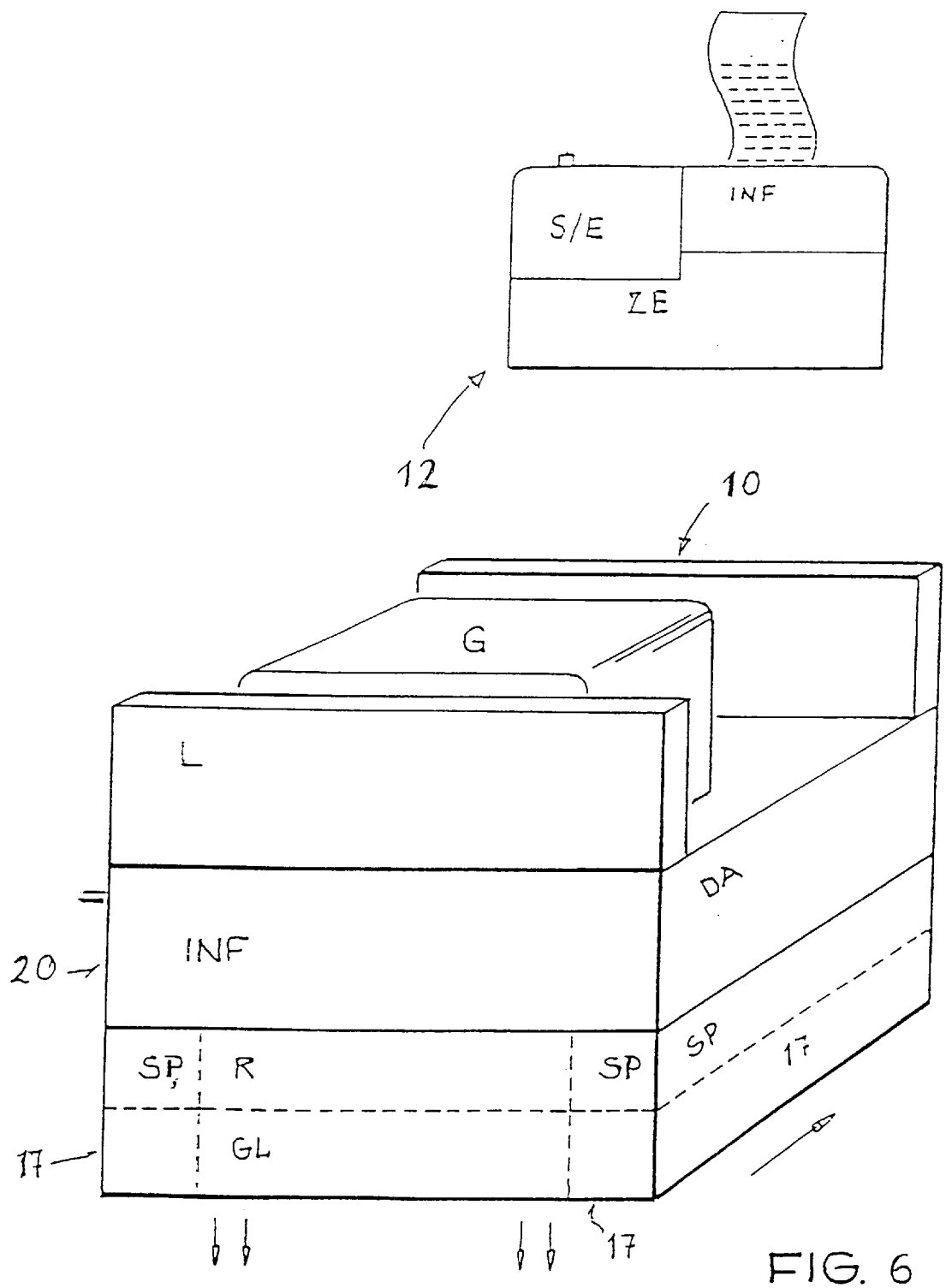
FIG. 6 illustrates the structural design of the transport element.

The transport element illustrated in FIG. 6 as a type of it pallet comprises a drive part An, which is symbolically illustrated in the lower plane, along with track guidance SP and glide function GL. This lower plane, with the uppermost plane L, which is provided for storing goods G, forms a sort of conventional track-guided car. This car is supplemented by an information plane INF or 20 to form a self-sufficient system of the transport element 10 (FIG. 1). This center plane receives data from a stationary station 12, which includes a transmitter and a receiver for the above-described exchange of information. A data processing DA is also provided, which can serve actuators A and sensors Se (FIG. 2). It is therefore possible to execute, for example, magnetic track guidance and gravity compensation with spacing control. The center ZE transmits commands that effect regulation of the drive. The spacing of the individual transport elements or vehicles is also regulated by the exchange of information between the vehicles, so no collisions can occur. The uppermost plane of storage and input and output L can be equipped in numerous ways, for example with a lifting element or a roller conveyor.

Figure 7:
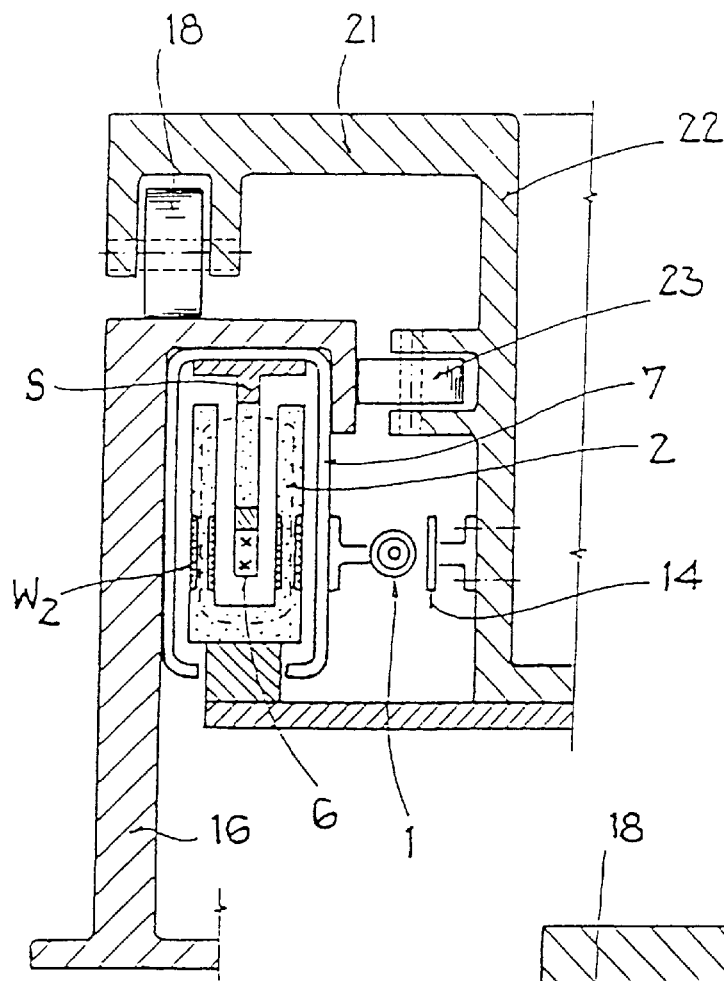
FIG. 7 illustrates an embodiment of the energy and information transmission.

FIG. 7 shows a preferred embodiment of the invention. Here the outside U profile 7 of the primary element of the energy transmission is simultaneously used as a support element for the coaxial cable for the transmission of information. The profile preferably comprises aluminum. In the use of steel for the support element 16, it is advantageous to insert the outside conductor 7 of the energy transmission, comprising approximately 2 mm-thick, U-shaped aluminum sheet, into the steel profile. Then the conductor support S, which primarily comprises ferrite and is secured, for example, by means of screws to the steel profile 16, is inserted into the steel profile. The rollers 18 supporting the car are secured to the body 22 by the axle support 21. Guide rollers 23, of which only one is shown, are provided for guiding the car and avoiding excessive lateral deflection during cornering. This guide roller is likewise secured to the body 22 by an axle support. The patch antenna 14 is disposed opposite the slotted coaxial cable for transmitting information.

Figure 8:
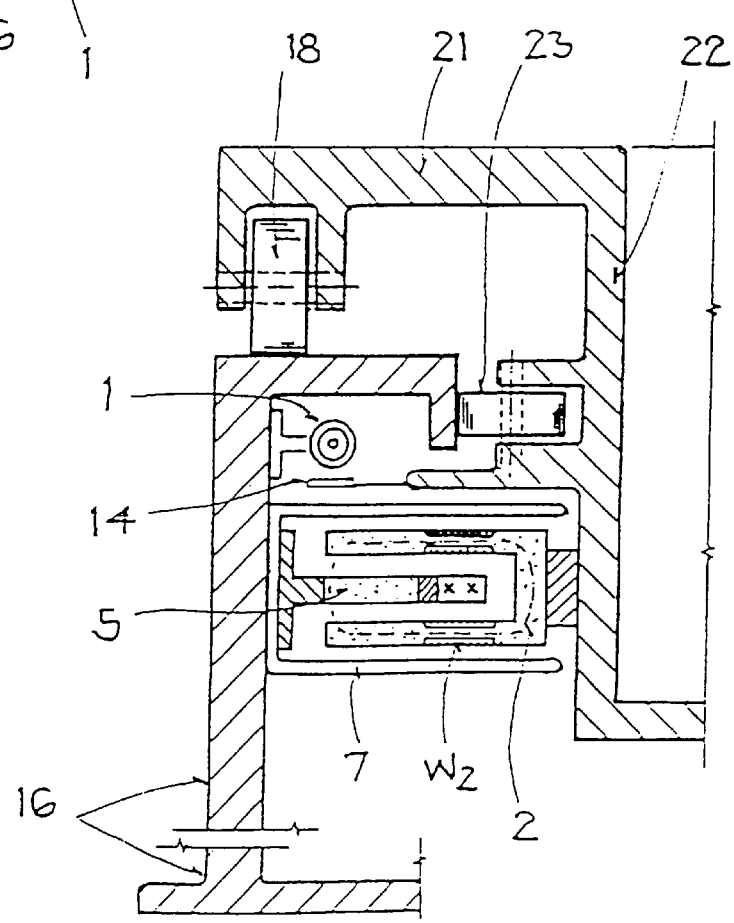
FIG. 8 illustrates an embodiment of the energy and information transmission with gaps disposed between the primary conductor arrangement and the transmitter head, parallel to the plane of movement.

In a further embodiment of the invention according to FIG. 8, the energy transmission is not integrated as extensively into the line profile 16. In this instance, the steel profile serves solely to receive and protect the energy transmitter and the information transmitter from mechanical damage. The arrangement of support roller and lateral guide roller is only one of many options in which the structural features correspond extensively to those of FIG. 7. The energy transmission and information transmission are secured, independently of one another, to the support element 16. The horizontal position of the conductor support S and the transmitter head 2 assure the necessary horizontal play during cornering. Should switches be provided, the movable part, with the transmitter head 2 and the antenna 14, can move out to the right.

In a further embodiment of the invention according to FIG. 9, the support element 16 has an E-shaped profile, with the U-shaped part 7 of the energy transmission being an electrically well-conducting region of the support element 16. It comprises pure aluminum, for example. The patch antenna 14 is located opposite the waveguide 1 on the base of the U-shaped transmitter head 2.

FIGS. 10 through 12 illustrate in detail the principle of the conductor arrangement of the primary circuit of the energy transmission, which is open on one side. In the transmitter head 2, a U-shaped ferrite core 2 encompasses the center conductor 6 and conducts the magnetic flux Φ through the secondary winding $W_2$ (FIG. 11). The center conductor 6 is fed at one end by way of a medium-frequency generator, so it conducts the current $I_1$. The conductor is connected to the housing at the end that is remote from the feed source. The current is divided into two partial currents $I_{1/2}$ due to the symmetry of the arrangement, and flows back via the housing to the medium-frequency generator MFG (FIG. 10).

Because of the current displacement—also frequently referred to as skin effect—occurring at high frequencies in solid conductors, such as the U-shaped housing (for example made of aluminum), the current is not distributed uniformly in the housing walls, but instead only penetrates the housing walls from the inside corresponding to the penetration depth $\delta_E$ (FIG. 12). With an aluminum housing, the penetration depth is approximately 0.5 mm at 25 kHz. The current is also not distributed uniformly over the inside circumference of the U profile, but instead flows primarily at the locations of the greatest magnetic field intensities. On the path segments on which no transmitter head is located, as shown in FIG. 12, these locations are the current-guide regions of the expansion $b_1$ that are disposed opposite and closest to the center conductor 6. For the return line, therefore, only a cross section is available that results from the current-conducting width $b_1$ and the penetration depth $\delta_E$ of the medium-frequency current, the depth being determined by the frequency and the material properties. The inside or center conductor 6 is advantageously manufactured from a high- or medium-frequency wire litz in order to eliminate the current displacement in this range.

The limited penetration depth of the current and the non-uniform distribution of the current density on the insides of the shield housing permit the effective resistance and the losses in the return line 7 to be higher than in the to inside conductor 6 comprising a medium-frequency litz wire. The shaping of the inside conductor and the return or outside conductor, which serves simultaneously as a shield and housing 7, is therefore intended to attain the widest possible current-conduction range of the width $b_1$ at the inside housing circumference. This is achieved most practically in a shape shown in FIG. 13, namely with the inside conductor 6 being narrow and having the largest possible height H. The dimensions of the entire transmitter arrangement, and the current intensity I required to transmit a specific power, are decisively determined by the size of the effective air gap in the magnetic circuit. So that the air gap of the magnetic circuit that conducts the magnetic flux need not be larger than the mechanical play $\delta_1$ and $\delta_2$ of the transmitter head, ferrite bodies 5 can be inserted into the support S of the center conductor. These ferrite parts practically do not increase the inductance of the center conductor at all, because, due to the laws of physics, the current in the side walls is always set spatially such that the inductance is minimal, that is, the current flows predominantly on the side parts opposite the center conductors.

Figure 13:
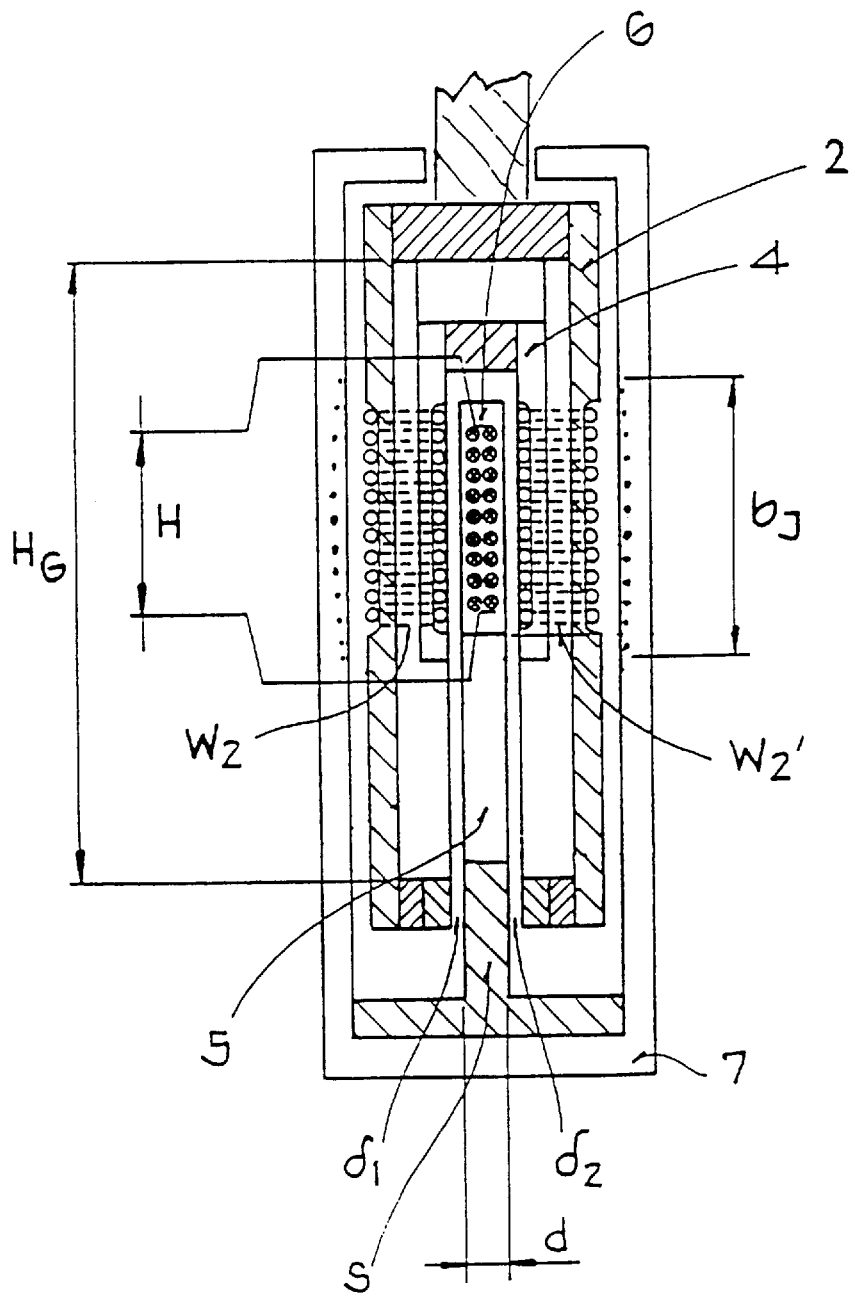
FIG. 13 is a cross-section of a particularly advantageous, detailed embodiment of a coaxial conductor arrangement with a transmitter head.

In the U-shaped ferrite core 2 in FIG. 13, as in FIG. 5a, the secondary winding comprises two partial windings $W_2$ and $W_2'$, which are disposed on both legs of the core, directly opposite the inside conductor, which has expanded in height H. This winding arrangement attains a high magnetic coupling factor with respect to the primary circuit, and an optimum utilization of the available winding space with a small structural shape and low inductance of the coaxial conductor.

For many applications of contactless energy transmission, for example in conveying technology, transmitter arrangements are required in which a plurality of consumers with an arbitrarily changeable power requirement can move on the same transmission path. The insertion of a plurality of transmitter heads into the open coaxial conductor or the primary conductor loop 6 leads electrically to a series connection of the movable consumers.

In an advantageous embodiment of the invention, a constant medium-frequency current $I_1$ is impressed into the primary-side coaxial conductor. To this end, it is advantageous to use electronic power-setting members on the secondary side that feed different consumers with the necessary voltages and currents.

In a further embodiment of the invention, the drive motor is a linear motor having a passive stator in the path. In the use of a linear motor, it is advantageous to compensate the weight of the transport element, including the goods to be loaded onto it, with a magnetic levitation system. This floating suspension must be stabilized by a track guide acting on the sides of the vehicle. Like the floating of the vehicle, this can be effected with magnets that assure precise track guidance using an air-gap regulation.

What is claimed is:

1. A track-guided transport device for transporting goods, comprising:
    path means for providing a path of travel, the path means including support and track-guidance elements (16);
    a transport element (10) to carry the goods, the transport element (10) including a data-processing and information-transmission unit (20), and a regulatable and controllable drive unit (17) for moving the transport element (10) along the path of travel;
    an energy-transmission device for contactless, inductive transmission of electrical energy to the transport element, the energy-transmission device including a conductor arrangement (6, 7) that is laid along the path of travel and that forms a primary circuit of the energy-transmission device, and a transmitter head (2) that is connected to the transport element, with the transmitter head including a soft-magnetic ferrite core and a secondary winding ($W_2$) that surrounds the core and is magnetically coupled to the primary circuit; and
    information-transmission means for transmitting information between the transport element (10) and a stationary station, the information-transmission means including a member that is integrated into the conductor arrangement (6, 7) of the energy-transmission device or is integrated into the support and track-guidance elements (16) of the path means,
    wherein the conductor arrangement (6, 7) of the primary circuit of the energy-transmission device is integrated into the support and track-guidance elements (16), and
    wherein the primary circuit includes an inside conductor (b) and a U-shaped outside conductor (7) which surrounds the inside conductor coaxially, the outside conductor (7) being connected to the support and track-guidance elements in a conductive manner.

2. A track-guided transport device accordance to claim 1, wherein the member of the information-transmission means comprises a leakage waveguide (1) that is laid along the path of travel and secured to the support and track-guidance elements (16) or to the conductor arrangement (6, 7), and wherein the information-transmission means further comprises an antenna (14) that is disposed on the transport element (10) for transmitting information between the transport element (10) and the leakage waveguide (1).

3. A track-guided transport device according to claim 2, wherein the leakage waveguide (1) is configured as a coaxial line that is provided with slots (3) extending transversely to the direction of wave propagation and acting as radiation openings, with the slots spacing periodically repeating in groups.

4. A track-guided transport device according to claim 3, wherein the antenna (14) is carried by the transmitter head (2) and disposed adjacent the leakage waveguide (1).

5. A track-guided transport device according to claim 2, wherein the leakage waveguide (1) is configured as a coaxial line having a longitudinal slot (3) in the axial direction, and wherein the antenna is configured as a near-field sensor that is movable along the longitudinal slot.

6. A track-guided transport device according to claim 2, wherein the energy-transmission device further includes a conductor support (S) for the inside conductor (6) of the primary circuit, the conductor support having an upper end and the leakage waveguide (1) being disposed at the upper end of the conductor support (S).

7. A track-guided transport device according to claim 1, wherein the member of the information-transmission means comprises a leakage waveguide (1), wherein the support and track-guidance elements have angles and gaps, and wherein the conductor arrangement (6, 7) of the energy-transmission device and the leakage waveguide (1) of the information-transmission means are disposed in the angles and gaps of the support and track-guidance elements (16).

8. A track-guided transport device according to claim 2, wherein a carrier frequency of the ISM band 2.4 GHz is received by the leakage waveguide (1) to transmit information.

9. A track-guided transport device according to claim 2, wherein the conductor arrangement (6, 7) of the energy-transmission device simultaneously forms the leakage waveguide (1) of the information-transmission means.

10. A track-guided transport device according to claim 1, wherein the information-transmission means further includes a first coupling element (K) that is configured as a filter and that is connected at a feed-in point for transmitting energy, which coupling element superposes a medium-frequency current with a higher frequency signal for transmitting information from the stationary station (12) to the transport element (10), and, in an opposite direction, separates a higher frequency signal for transmitting information from the transport element (10) to the stationary station (12) from the medium-frequency current, and a corresponding second coupling element (K') that is connected to the secondary winding (W2, W2') of the transmitter head (2).

11. A track-guided device according to claim 1, wherein electrical energy is supplied to the conductor arrangement (6, 7) at a feed-in point, wherein the energy-transmission device further includes an insulating conductor support (S) for the inside conductor (6), and connection means for connecting the inside conductor (6) to the outside conductor (7) at an end of the conductor arrangement (6, 7) that is remote from the feed-in point, and wherein the ferrite core is U-shaped and has legs that surround the inside conductor (6) and support the secondary winding ($W_2$).

12. A track-guided transport device according to claim 1, wherein the transport element (10) includes a capacitor (C) and a load (Z), the data-processing and information-transmission unit (20) and the drive unit (17) providing at least a portion of the load (Z), the load (Z) being connected to the secondary winding ($W_2$) and the capacitor (C) being connected parallel to the load (Z).

13. A track-guided transport device according to claim 2, wherein the transport element (10) further includes another capacitor (C2) that compensates for inductive line drop, the another capacitor (C2) being connected between the secondary winding ($W_2$) and the load (Z).

14. A track-guided device according to claim 1, wherein the ferrite core is U-shaped and has legs, and wherein the energy-transmission device further includes a conductor support (S) for the inside conductor (6), the conductor support (S) having a ferritic region for reducing magnetic gap widths between the conductor support (S) and the legs of the ferrite core.

15. A track-guided transport device according to claim 1, wherein a gap plane between the conductor arrangement (6, 7) and the transmitter head (2) extends parallel to the path of travel in order to assure play for vehicle cornering.

16. A track-guided transport device according to claim 1, wherein the transport element (10) further includes a roller (18) running on at least one of the support and track guidance elements (16), the gravitational force acting on the transport element (10), including the goods carried by it, being compensated by the roller (18).

17. A track-guided transport device according to claim 1, wherein the drive unit (17) comprises a linear motor, and further comprising a magnetic levitation system to compensate for the gravitational force acting on the transport element (10), including the goods carried by it.

18. A track-guided device according to claim 1, wherein information concerning at least one of conveying, storing, sorting, and distribution of goods carried by the transport element (10) is received by the data-processing and information-transmission unit (20) from the stationary station (12).

19. A track-guided device according to claim 1, further comprising a driven transverse belt conveyor for loading and unloading goods (G) onto and from the transport element (10).

20. A track-guided device according to claim 1, further comprising switches serving as active track-guidance elements.

* * * * *